United States Patent [19]
Garratt et al.

[11] Patent Number: 5,150,314
[45] Date of Patent: Sep. 22, 1992

[54] METROLOGICAL APPARATUS AND CALIBRATION METHOD THEREFOR

[75] Inventors: John D. Garratt; Paul J. Scott; Ian K. Buehring, all of Leicester, United Kingdom

[73] Assignee: Rank Taylor Hobson Limited, United Kingdom

[21] Appl. No.: 542,718

[22] Filed: Jun. 22, 1990

[30] Foreign Application Priority Data

Jun. 23, 1989 [GB] United Kingdom ............... 8914418
Jun. 23, 1989 [GB] United Kingdom ............... 8914419

[51] Int. Cl.$^5$ .................. H03M 1/06; G01D 5/34
[52] U.S. Cl. ..................... 364/571.02; 364/560; 33/551
[58] Field of Search .......... 364/551.01, 560, 571.01, 364/571.02, 474.28, 474.29, 573, 724.01, 572, 581; 33/551, 503, 504; 341/139, 140

[56] References Cited

U.S. PATENT DOCUMENTS

| | | | |
|---|---|---|---|
| 4,377,911 | 3/1983 | Iida et al. | 33/551 |
| 4,588,979 | 5/1986 | Adams | 364/724.01 |
| 4,736,208 | 4/1988 | Schmidt | 364/560 |
| 4,800,364 | 1/1989 | Mortara | 364/577 |
| 4,807,152 | 2/1989 | Lane et al. | 364/560 |
| 4,849,916 | 7/1989 | Abbe et al. | 364/560 |
| 4,896,282 | 1/1990 | Orwell | 364/571.01 |
| 4,912,397 | 3/1990 | Gale et al. | 364/573 |
| 5,063,291 | 11/1991 | Buehring | 250/231.16 |

FOREIGN PATENT DOCUMENTS

| | | |
|---|---|---|
| D253090A1 | 10/1986 | Fed. Rep. of Germany . |
| 2165361 | 4/1986 | United Kingdom . |
| 2207511 | 2/1989 | United Kingdom . |

*Primary Examiner*—Parshotam S. Lall
*Assistant Examiner*—Michael Zanelli
*Attorney, Agent, or Firm*—Lerner, David, Littenberg, Krumholz & Mentlik

[57] ABSTRACT

A metrological apparatus for measuring form and texture of a surface employs an inductive transducer producing an AC gauge signal, and a tracking AC analogue to digital converter. In order to avoid errors in the output signal at a relatively high speed of traverse of the surface due to a non-flat frequency response of the converter, the output signal is processed by a digital filter to provide a combined frequency response which is flat over a desired range. In order to avoid errors in the output signal due to non-linearity of the transducer, a square or cubic correction is applied to the signal. A method calibrating the apparatus to obtain coefficients for the square and cube terms in the correction process is also described.

21 Claims, 6 Drawing Sheets

METROLOGICAL APPARATUS AND CALIBRATION METHOD THEREFOR

This invention relates to metrological apparatus and particularly concerns such apparatus for measuring surface characteristics of a workpiece.

Conventionally, such apparatus includes a stylus which traverses the surface of the workpiece and a transducer which produces a signal dependent upon the movement of the stylus in response to surface characteristics such as texture or form. Most presently available apparatus for measurement of surface characteristics are only capable of measuring surface texture, which requires high resolution, in a separate operation from the measurement of form, requiring a relatively long range of operation of the transducer. This is because most currently available apparatus arranged for sensing the surface of a workpiece have a relatively low ratio of range to resolution. An instrument which is capable of simultaneously measuring surface texture and form is commercially available but this employs an interferometric transducer which provides the required high ratio of range to resolution and such a transducer is expensive and, due to the need to accommodate various optical elements and a laser, the apparatus is somewhat bulk.

Relatively low cost transducers are available, in particular, transducers which operate inductively. These transducers produce an analogue output signal which, in order to be useful in modern computer based instruments, must be converted to digital form. Current gauging circuitry, available at reasonable cost, would not justify the use of current high accuracy analogue to digital converters, with greater than 10 bit resolution. This does not provide sufficient resolution over the required range to permit surface texture and form to be measured simultaneously.

Accordingly, there is a need for a low cost surface sensor arrangement which includes a transducer connected directly to an analogue to digital converter which is capable of converting the output of the transducer to digital form with the required range and resolution, thus obviating the need for current gauging circuitry with its shortcomings. Further, it is desirable that the instrument should be capable of operation at various speeds of traverse of the surface sensor. Therefore, to meet this need, it is also necessary that the analogue to digital converter should be capable of accurately digitizing an analogue input signal whose frequency may vary dependent upon the speed of traverse of the sensor over the workpiece surface and upon the workpiece surface characteristics.

There is known from GB-A-2207511 an electronic gauge in which an output variable (in this case the frequency of a signal) is non-linearly related to displacement distance owing to an S-shape error. This is corrected by quadratic correction equations. The co-efficients of the quadratic equations are said to be determined experimentally, but no indication is given of how this might be done. The purpose of the quadratic equations appears to be to improve the accuracy of the transducer over its normal range, rather than to extend its range. The transducer shown in GB-A-2207511 has a core which moves in a straight line, as it is in line with the stylus. This avoids errors arising from curved motion of the core, which can arise in a transducer in which the stylus and the core rotate around a pivot, so that the correction of transducer errors is relatively simple. However, the bulk of the in-line arrangement of the core prevents the transducer from being used to measure surfaces with restricted access, such as the inner surface of a ring.

The invention is concerned with solving these problems.

In one aspect, the invention provides a surface sensing arrangement for a metrological instrument, including a transducer for producing an analogue signal representing surface characteristics, an analogue to digital conversion means which comprises a tracking loop operable to produce a digital output signal which tracks the analogue signal from the transducer, and compensating means for compensating for a non-flat frequency response of the tracking loop.

In another aspect, tho invention aims to provide a metrological apparatus in which improved ratio of range to resolution is provided using a relatively low cost transducer, such as an inductive transducer. Preferably this is achieved by a means for performing a compensation operation on signals derived from the transducer to enhance the range thereof.

The invention is described further, by way of example, with reference to the accompanying drawings in which.

Figure 1:
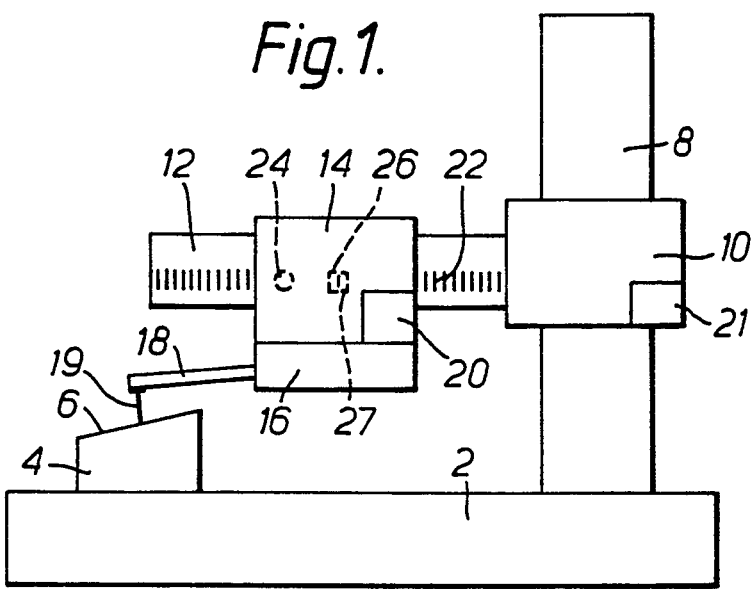
FIG. 1 is a diagram of a metrological apparatus in which the invention may be embodied.
Figure 3:
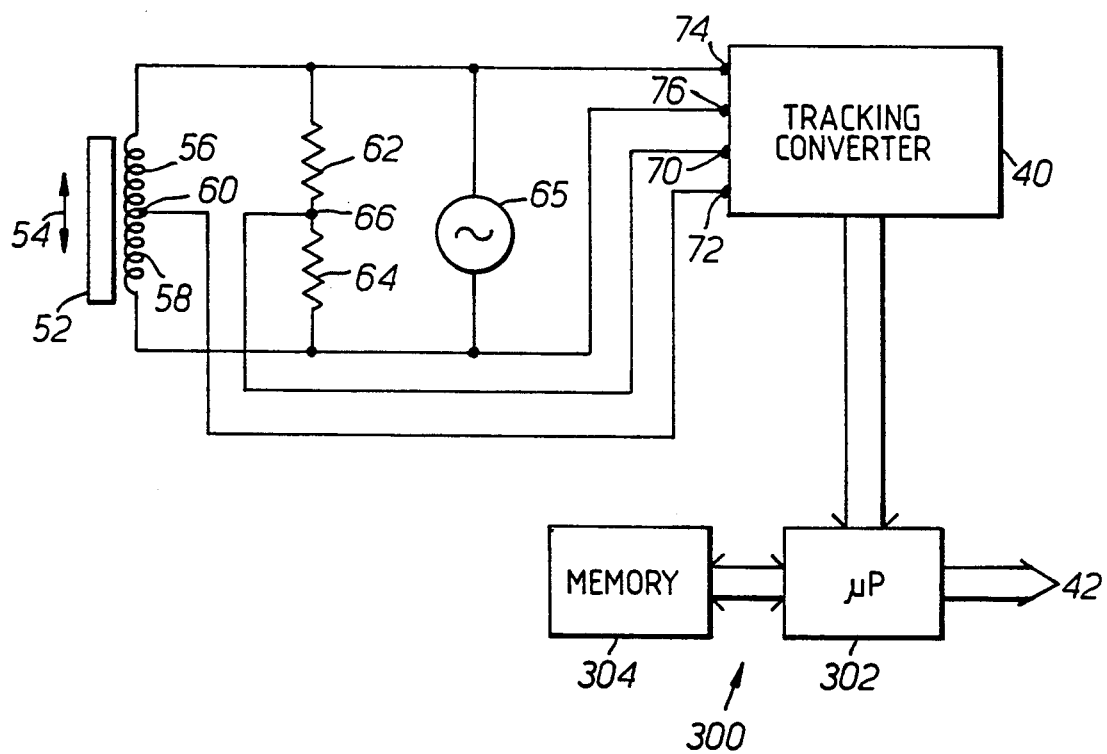
FIG. 3 shows, in more detail, part of the circuitry of FIG. 2.
Figure 8:
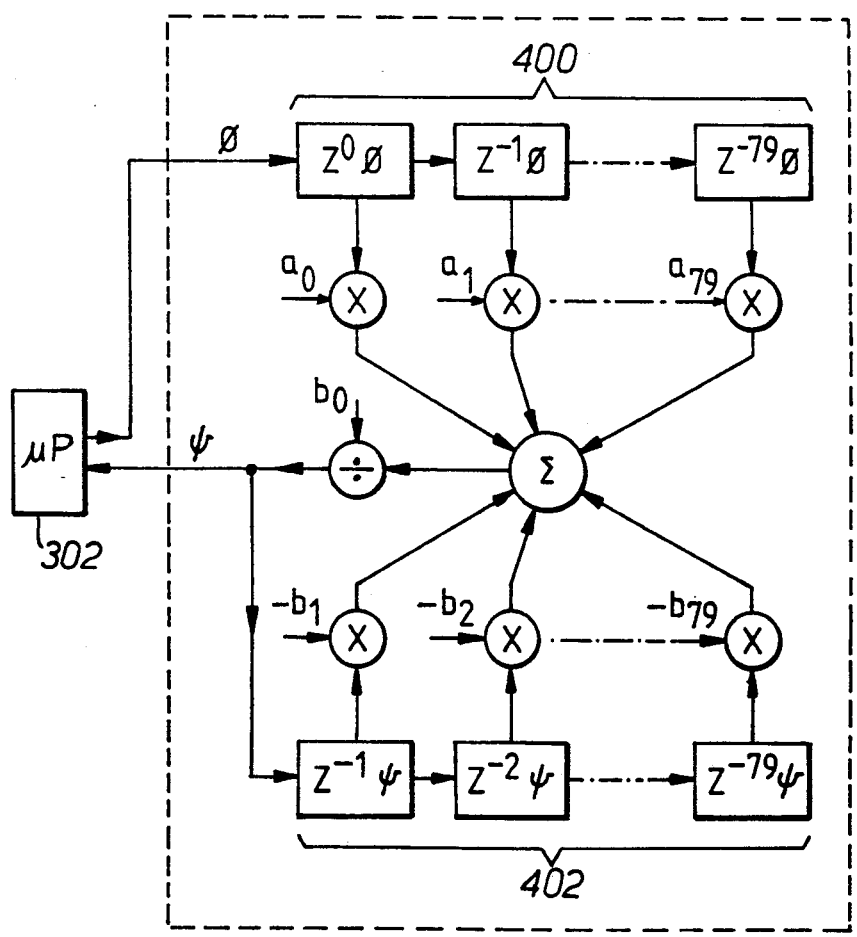
Figure 9:
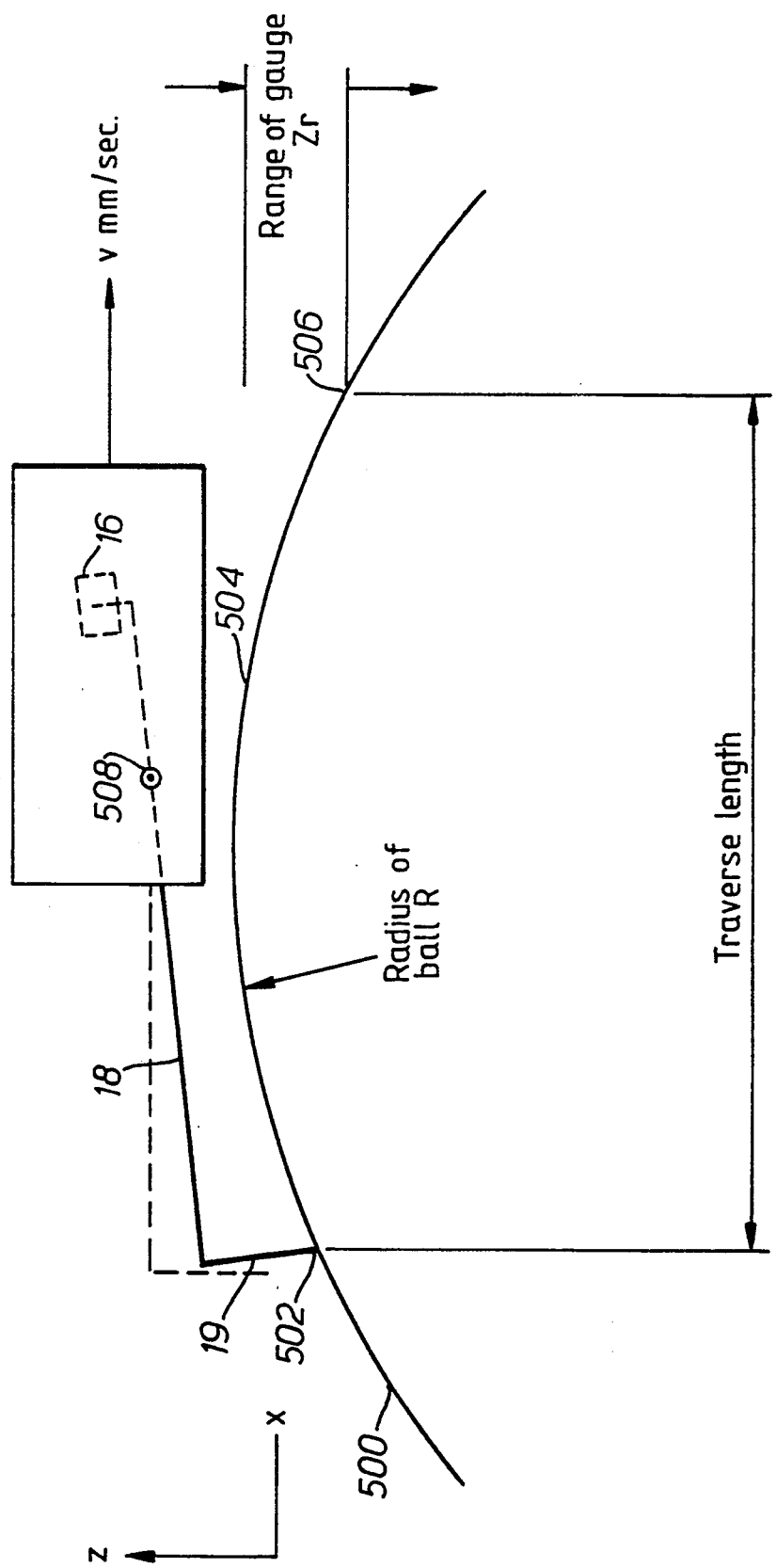

FIG. 8 schematically shows the operation of a filter associated with the circuitry of FIG. 3; and FIG. 9 is a diagram illustrating the movement of a stylus included in the apparatus of FIG. 1, in order that the calibration of the apparatus may be understood.

Figure 2:
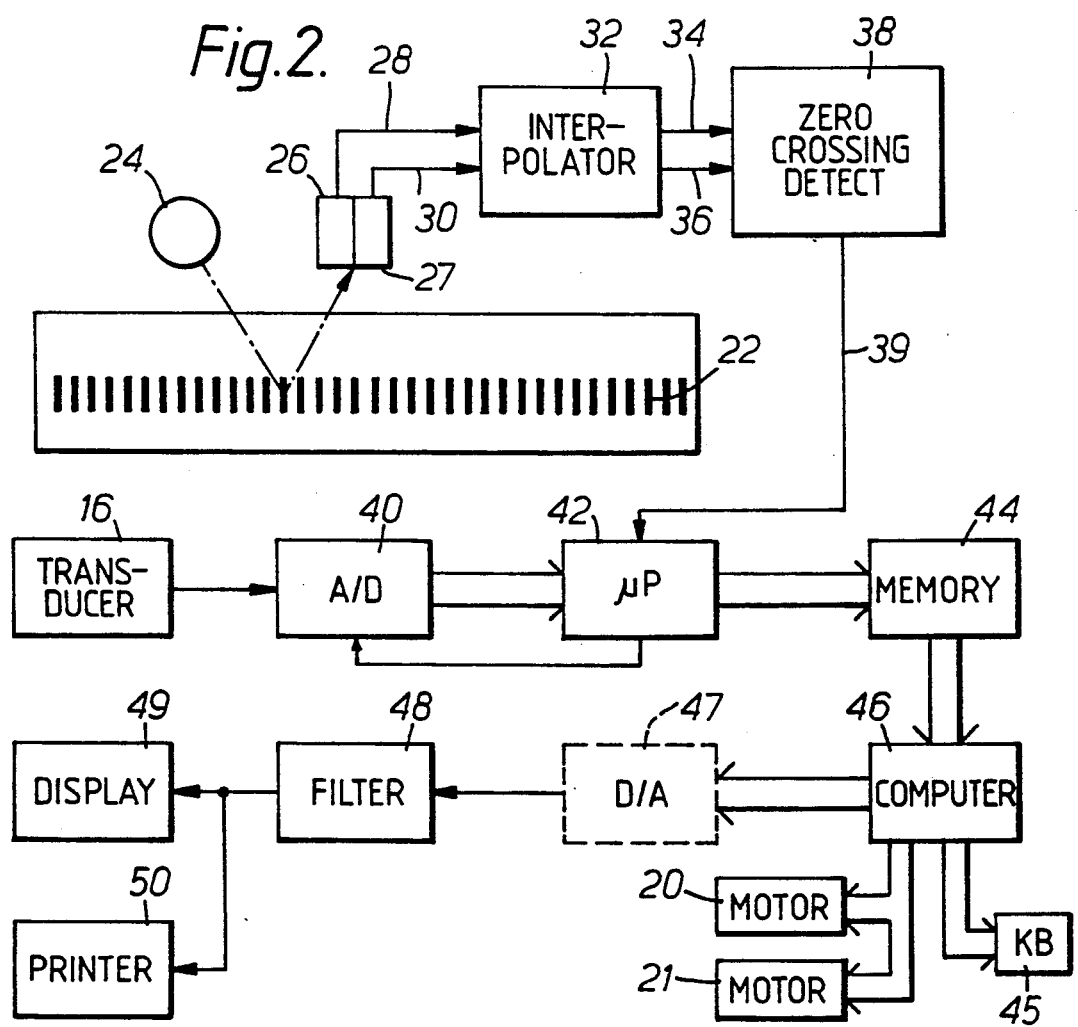
FIG. 2 is a simplified block diagram of electrical circuitry included in the apparatus of FIG. 1.

With reference to FIGS. 1 and 2, a metrological instrument for measuring surface texture or form comprises a base 2 for supporting a workpiece 4 having a surface 6 whose texture is to be measured. A vertical column 8 secured to the base 2 supports a vertically movable carriage 10 on which a horizontal datum bar 12 is mounted. A further carriage 14 is mounted for horizontal movement along the bar 12 and carries a transducer 16 having a stylus arm 18 carrying a stylus 19. A motor 20 indicated diagrammatically in FIG. 1 is provided on the carriage 14 for effecting horizontal movement thereof along the datum bar 12 and a further motor 21 is provided on the carriage 10 for effecting vertical movement thereof up and down the column 8.

In operation of the apparatus, the carriage 10 is arranged at a vertical position such that the stylus 19 engages the surface 6. Thereafter, the motor 20 is operated to cause the carriage 11 to move horizontally along the datum 12 thus causing the stylus 19 to traverse the surface 6 to be measured.

A linear optical grating, shown schematically at 22 in FIG. 1, comprising a series of reflective and non-reflective bands, is fixed with respect to the datum 12 and light from a light source 24 is reflected from the grating 22 and detected by a pair of light sensors 26, 27 mounted on the carriage 14. Alternatively, the grating may be formed of a series of transmissive and non-transmissive bands, with the sensors 26, 27 arranged to detect light transmitted through the grating. A reference scale (not shown) may be provided associated with the sensors 26, 27. As the carriage moves along the datum bar 12, the sensors 26, 27 provide sinusoidal electrical signals on lines 28 and 30 respectively. The sensors 26 and 27 are positioned so that the signals on lines 28 and 30 are in quadrature. These signals are applied to an interpolator 32 which causes their frequencies to be quadrupled. This may be done in the manner described in the patent application filed concurrently herewith application Ser. No. 542,707, now U.S. Pat. No. 5,063,291, and claiming the priority of UK patent application 8914417.4. The concurrently filed application is incorporated herein by reference. The interpolator 32 outputs the resulting signals on lines 34 and 36 and supplies them to a zero crossing detector 38 which outputs a pulse on line 39 in response to each zero crossing point in each of the signals on lines 34 and 36. In one commercially available sensor arrangement, if the grating 22 has a pitch of 8 microns, the signals from sensors 26, 27 have a period corresponding to 4 microns. A pulse then appears on lines 39 for each 0.25 microns of movement of the carriage 14 along datum bar 12.

As the carriage 14 is moved along the datum bar 12 and the stylus 19 is thereby caused to traverse the workpiece surface 6, the stylus 19 moves substantially vertically in response to the features of surface texture and form of the surface 6. Transducer 16 is an inductive transducer and, in response to this substantially vertical movement, produces an output signal which is digitized by an analogue-to-digital converter 40 and supplied to a microprocessor 42 which in response to the pulses on lines 39, samples tho digitized signal from transducer 16 at 0.25 micron intervals of movement of the carriage 14 along the datum bar 12 and stores the resulting samples in a memory 44. The apparatus includes a computer 46 which is programmed to effect a general overall control of the apparatus, including control of motors 20 and 21, and to process the signals stored in memory 44 to provide information as to the surface texture and form of the surface 6. A keyboard 45 is provided for inputting instructions to computer 46. Signals representing the surface characteristics are output by computer 46, via a low pass filter 48 Which filters out unwanted high frequency noise, to a display device 49, such as a cathode ray tube, and a printer 50 which may be operable to produce a trace of the surface of the workpiece. The display device 49 and printer 50 may receive digital input signals. Alternatively, either or both of them may receive analogue input signals provided via an optional digital-to-analogue converter 47 as shown in FIG. 2.

With reference to FIG. 3, the transducer 16 comprises a magnetic core 52 which is attached to one end of the stylus arm 18 and is movable in either direction as shown by the arrow 54 in response to movement of a stylus 19 at the other end of the stylus arm 18, as the stylus 19 traverses the workpiece surface. Coils 56, 58 magnetically coupled to the core 52 are centre tapped at 60 and form two arms of a bridge circuit, the other two arms of which are constituted by equal resisters 62, 64. A reference oscillator 65 supplies reference oscillations Vsinwt to the bridge circuit and the arrangement is such that, when the core 52 is at a centre position, the impedence of the coils 56 and 58 is equal and the voltage difference between the centre tap 60 and a further centre tap 66 between resistors 62 and 64 is zero. If the core 52 is displaced in one direction, an in-phase sinusoidal voltage kVsinwt appears between taps 60 and 66 having an amplitude kV (k being between 0 and 1) dependent upon the distance through which the core is moved. If the core 52 is moved in the opposite direction from the centre position, an out-of-phase voltage kVsinwt (k being between 0 and $-1$) of opposite phase appears between taps 60 and 66 with an amplitude $-kV$ dependent upon the distance through which the core 52 has been moved. Taps 60 and 66 are connected to provide a gauge signal kVsinwt to input terminals 70, 72 of analogue-to-digital converter 40 which also receives a reference signal Vsinwt from the oscillator 65 on further input terminals 74, 76. The circuit 40 outputs a digital signal $\phi$ representing the amplitude of a voltage between taps 60 and 66 for sampling by microprocessor 42.

Figure 4:
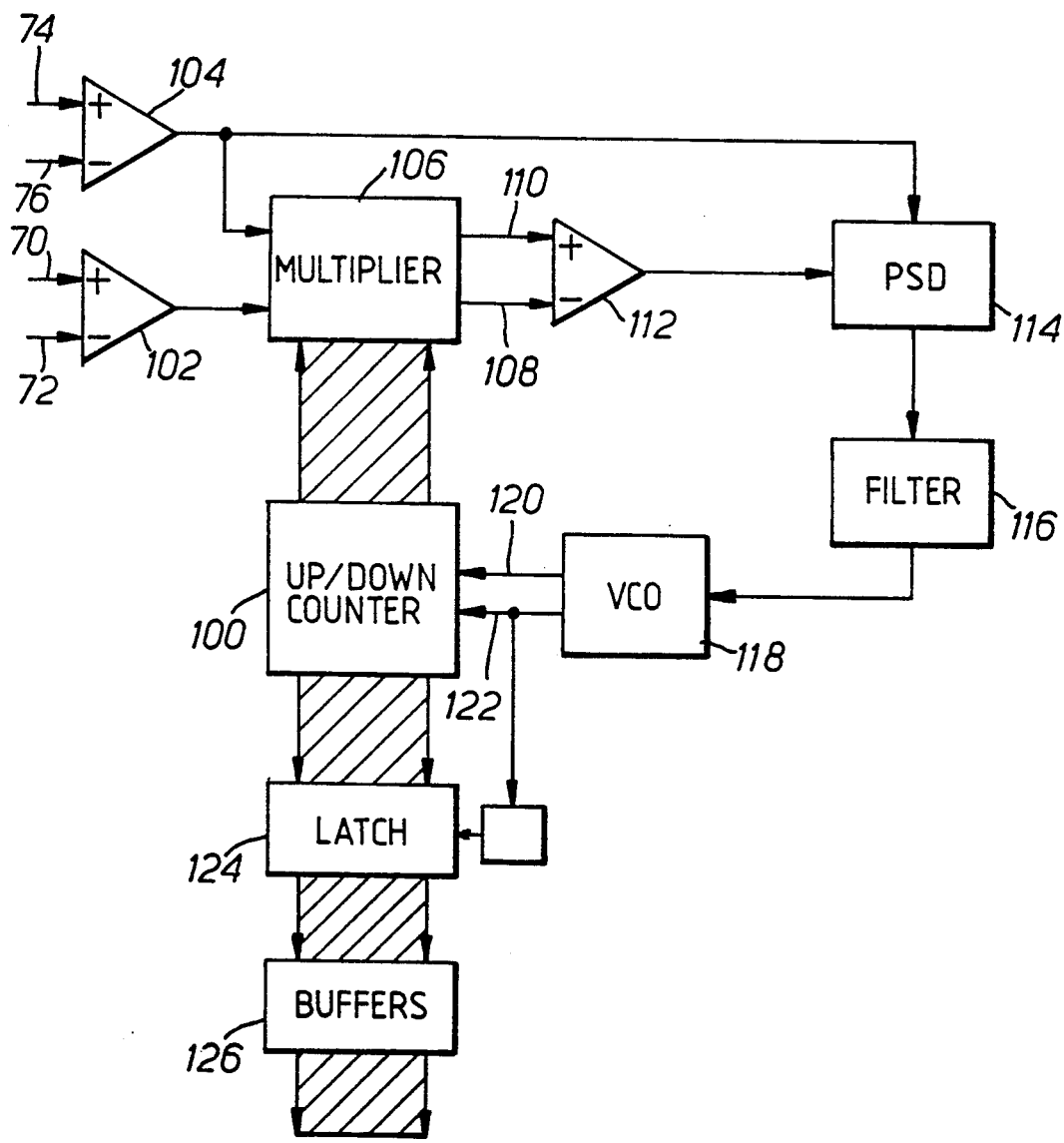
FIG. 4 is a block diagram showing in detail part of the circuitry of FIG. 3.

The analogue to digital converter 40 is operable to provide a high resolution output signal, preferably to 15 bits and is constructed as shown in FIG. 4.

Referring to FIG. 4, the digital value of the output signal is held in an up-down counter 100. The gauge signal kVsinwt and the reference signal Vsinwt are input to buffer amplifiers 102, 104 respectively, and the buffered values are fed to a high accuracy multiplier 106. The multiplier 106 also receives the digital output value $\phi$ from the counter 100 and is operable to multiply the gauge and reference signals by $\cos \phi$ and $\sin \phi$, respectively, to produce outputs on lines 108, 110 of kVsinwt.cos$\phi$ and V sinwt.sin$\phi$, respectively. These signals on lines 108, 110 are then subtracted at an error amplifier 112 to produce an error signal Ve=Vsinwt (k cos$\phi$ − sin$\phi$), which can be represented as $$Ve = V\sqrt{1 + k^2} \sin wt \cdot \sin(\theta - \phi)$$

where $$\sin\theta = k/\sqrt{1 + k^2}.$$

The error signal Ve is fed to a phase sensitive detector 114, where it is multiplied by the buffered reference signal Vsinwt to produce a signal Vpsd given by $$V_{psd} = V^2\sqrt{1 + k^2} \cdot \sin^2 wt \cdot \sin(\theta - \phi)$$

which can be represented as $$V_{psd} = V^2\sqrt{1 + k^2} \cdot \sin(\theta - \phi) \cdot (1 - \cos 2wt)/2$$

This signal is then filtered by a filter 116 to remove the alternating component at frequency 2 w to leave a detector signal Vd given by:

$$V_d = V^2\sqrt{1 + k^2} \sin(\theta - \phi)/2.$$

The detector signal Vd is used as the control voltage for a voltage controlled oscillator (VCO) 118 which controls the up/down direction of the counter 100 by a signal on line 120 and provides count pulses on line 122.

the microcomputer 302 and is also input to the shift register 402. The coefficients $a_0$ to $a_{79}$ and $b_0$ to $b_{79}$ are downloaded from the microcomputer 302 during initialization of the apparatus.

Figure 5:
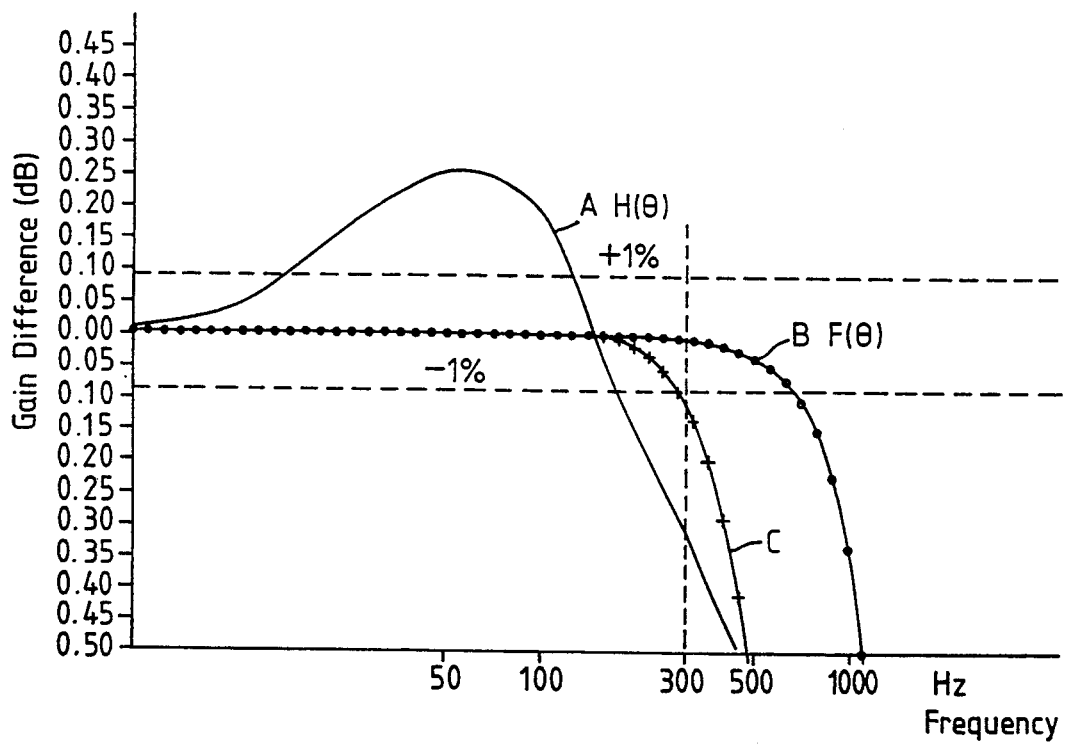
FIG. 5 is a plot illustrating the frequency response of the circuitry of FIGS. 3 and 4.

In FIG. 5, curve C illustrates the resulting gain of the converter after compensation obtained in an experimental circuit. As can be seen, curve C remains within the plus or minus 1% limit until a point very close to 300 Hz.

As noted above, analogue to digital conversion devices as shown in FIG. 4 are commercially available and provide highly stable operation. In view of the 15 bit output, a range to resolution ratio of approximately 32,000 is available from such a circuit. However, the range of displacements of the transducer over which it provides an output with good linearity is typically too small to match this range to resolution ratio. The linearity of the output will vary depending on the precise nature of the transducer used. However, a small size transducer may perhaps have an output error of 0.1% at displacements of the core of 0.1 mm in either direction from a centre position, which would be its normal operating range, whereas the range-to-resolution ratio given above may require it to move by up to 0.5 mm from the centre position, at which displacement the error may have risen to 5%. Such a transducer cannot provide the high range-to-resolution ratio with an acceptable level of accuracy over the full range.

The non-linearity with large core displacements can arise through a variety of factors. Typically, movement of the stylus 19 causes the stylus arm 18 to pivot about a pivot point between the stylus 19 and the core 52. The consequent arcuate movement of the core 52 causes it to change its angle with respect to the coils 56, 58 as it moves. Additionally, large displacements will move the core 52 laterally so as to vary the spacing between it and the coils 56, 58. Thus, large displacements result in non-linear changes in the coupling between the core 52 and the coils 56, 58, and these changes will not have matching effects on the two coils 56, 58. The arrangement of coils 56, 58 shown in FIG. 3 enables it to act as a differential transducer, in which movement of the core 52 results in inductance being lost from one coil and gained by the other. However, with large movements the core 52 can become only very weakly coupled to one of the coils, so that the changes in inductance of the two coils no longer match. Further inaccuracies may arise from the finite size of the tip of the stylus 19. A preferred aspect of the present invention compensates for this non-linearity, so as to extend the range of displacements over which the transducer 16 can be used, in order to enable the high range to resolution ratio available from the high range to digital-to-analogue converter to be used accurately.

In order to carry out this compensation, the computer 46 is programmed to obtain a signal Z representing the true displacement of the core 52 (and therefore the true displacement of the stylus tip in response to features of the workpiece surface) by performing the following computation on the signals now represented as z obtained by microprocessor 42 from the output of device 40 and stored in memory 44:

$$Z = Az + Bz^2 + Cz^2$$

In this equation, A, B and C are calibration constants. These are calculated, before operation of the machine, in a calibration operation in which, as shown in FIG. 9, the stylus 19 is caused to traverse the surface of a calibration ball 500 from a position 502 through a centre position 504 to a final position 506 which are such that, during this movement, the stylus moves throughout its entire range of operation.

It will be noted from FIG. 9 that the stylus 19 is mounted for pivotal movement about a pivot point 508 and as a result movement in the Z direction (vertical as seen in FIG. 9) is accompanied by a small amount of movement in the X direction (horizontal as seen in FIG. 9), as will be appreciated from a comparison of the full and broken line positions of the stylus 19 in FIG. 5. The microprocessor 42, in addition to causing the z values of the transducer output to be stored in memory 44, is effective to store therein the x position of the stylus as indicated by counting the pulses which occur on line 39. However, due to the movement of the stylus tip in the X direction which accompanies pivoting of the stylus about 508, these x values as initially stored in memory 44 are incorrect.

In the past, where such x direction errors have been compensated for, this has been done by adjusting the speed of traverse of the stylus or the speed of movement of a recording instrument. This is not entirely satisfactory, and does nothing to provide a signal having corrected x values. In the illustrated embodiment, the x values as stored in the memory 44 are corrected. Computer 46 achieves this by carrying out the following computation:

$$X = x + Dz + Ez^2$$

X is the corrected x value

In the above equation, D and E are also calibration constants.

The constants A, B, C, D and E in the above equations are calculated during the calibration operation illustrated in FIG. 9 in the following iterative manner.

Step 1. Firstly, the stylus 19 is caused to traverse the calibration ball 500 of known radius R and N samples of stylus signal $z_i$ ($i = 1, 2, \ldots, N$) and of the corresponding x position $x_i$ are taken and stored.

Step 2. From the values z1, x1 at the initial position 502, z(N/2), x(N/2) at the centre position 504, and zN, xN at the final position 506, the approximate centro coordinates (a, b) of the calibration ball 500 are determined.

Step 3. Initial values of the calibration constants are then taken to be $A = 1$, $B = 0$, $C = 0$, $D = 0$, $E = 0$.

Step 4. With these calibration constants, corrected values $Z_i$, $X_i$ of the samples are determined, and a series of evaluation values $T_i$ is calculated as follows:

$$Z_i = Az_i + Bz_i^2 + Cz_i^3 \qquad i = 1 \text{ to } N$$
$$X_i = x_i + Dz_i + Ez_i^2 \qquad i = 1 \text{ to } N$$
$$T_i = \{R^2 - (X_i - a)^2 - (Z_i - b)^2\}/2 \qquad i = 1 \text{ to } N$$

Step 5. Increments dA, dB, dC, dD, dE, da and db of the calibration constants A to E and of a and b, respectively are chosen so as to minimize a sum of squares difference measure F, where $$F = \Sigma F_i^2 \quad i = 1 \text{ to } N, \text{ and}$$

$$F_i = T_i - (X_i - a)da - (Z_i - b)db - (Z_i - b)z_i dA -$$
$$(Z_i - b)z_i^2 dB - (Z_i - b)z_i^3 dC - (X_i - a)Z_i dD - (X_i - a)Z_i^2 dE$$

The VCO 118 is arranged such that when Vd is greater than zero, then the output value $\phi$ is increased, and when Vd is less than zero, the output value $\phi$ is decreased and thus the circuit tends to minimize Vd so that $\sin(\theta - \phi)$ tends to zero. The digital output value $\phi$ is obtained from the counter 100 via a latch 124 and 3-state output buffers 126. Tracking AC analogue to digital conversion devices as illustrated in FIG. 4 are commercially available (for example the model AP 1304 converter or the model 2S56 converter available from Analog Devices, One Technology Way, PO Box 9106, Norwood, Mass. 02062, USA), but they suffer from the problem that the gain in the tracking loop varies as a function of the frequency of the modulation component of the gauge signal applied to terminals 70, 72. FIG. 5 illustrates in curve A a typical transfer function $H(\theta) = \phi/\theta$ of such a circuit. To meet the requirements of a metrological instrument capable of measuring both surface texture and form, it is highly desirable that the gain of the analogue to digital conversion circuit should remain within plus or minus 1% of a constant value for a range of frequencies of the modulation component from zero to about 300 Hz. As can be seen in FIG. 5, the curve A fails to meet this requirement and, accordingly, FIG. 5 shows that the known tracking loop type of AC analogue to digital converter is, per se, quite unsuited for use in the surface sensor arrangement of the type of metrological instrument with which the invention is particularly concerned. FIG. 5 also illustrates at curve B, a transfer function $F(\theta) = \psi/\theta$ which would be, in effect, ideal. The preferred embodiment of the invention includes compensating means, indicated at 300 in FIG. 3 for compensating for the transfer function of curve A. The compensating means 300 comprises a microprocessor 302 which receives the digital output from the tracking converter 40 and a memory 304 coupled to the micro-computer 302.

In operation, the microcomputer 302 reads, as inputs, a series of digital outputs from the tracking converter 40, stores a predetermined number of these input values in the memory 304, calculates output values $\psi$ and stores a predetermined number of the output values in the memory 304, the calculation of the current output value being dependent on the current and stored input values and the stored output values. More specifically, the calculation is based on the following.

Figure 6:
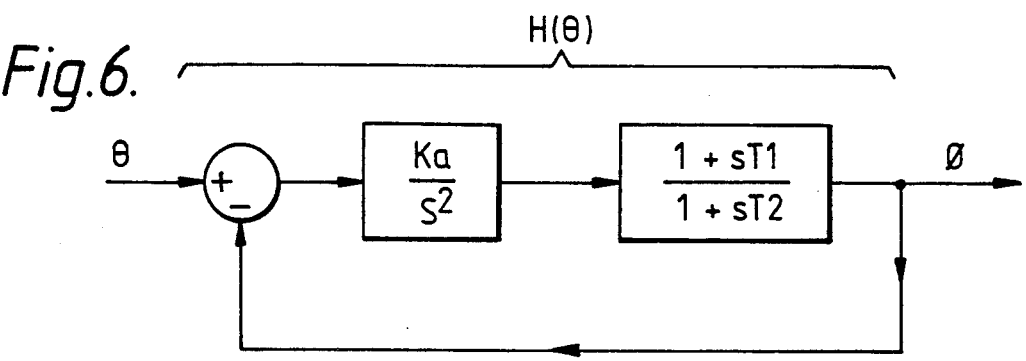
FIG. 6 illustrates a transfer function of the circuitry of FIG. 4.

The transfer function $H(\theta) = \phi/\theta$ of the tracking AC analogue to digital converter is represented in figure 6 from which it will be appreciated that:

$$H(\theta) = \frac{\phi}{\theta} = \frac{1 + sT1}{1 + sT1 + s^2/Ka + s^3 T2/Ka}$$

where s is the laplacian function jw, T1 and T2 are time constants, typically 2.412 ms and 0.345 ms, respectively, for the above-mentioned converter, and Ka is a constant, typically $454{,}821 s^{-2}$ for the above mentioned converter.

The desired transfer function $F(\theta)$ for the converter 40 and compensating means 300 in combination, as shown by curve B in FIG. 5, can be represented by:

$$F(\theta) = \frac{\psi}{\theta} = \frac{wo^2}{s^2 + 2\rho \cdot wo \cdot s + wo^2}$$

where wo is the desired new cut-off angular frequency, such as $2\pi \cdot 300$ radians/s, and $\rho$ is a damping factor.

Figure 7:
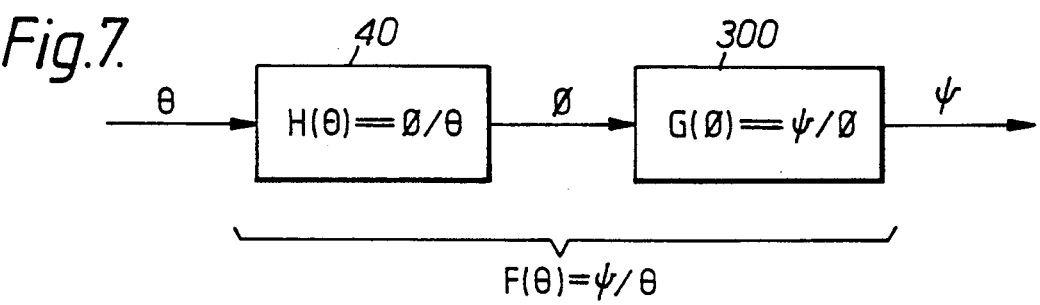
FIG. 7 illustrates a transfer function of the circuitry of FIG. 3.

Therefore, the transfer function $G(\phi)$ required of the compensating means 300 is given by:

$$G(\phi) = \psi/\phi = F(\theta)/H(\theta)$$

as illustrated schematically in FIG. 7.

The implementation of the compensation transfer function $G(\theta)$ by the microcomputer 302 and memory 304 requires the transformation of the continuous Laplace representation into a discrete representation. This is carried out, for example, by applying a bilinear transformation technique to the $G(\theta)$ function to obtain a discrete model of the form:

$$\frac{\psi}{\phi} = \frac{a_0 \cdot Z^0 + a_1 \cdot Z^{-1} + a_2 \cdot Z^{-2} + \ldots + a_n \cdot Z^{-n}}{b_0 \cdot Z^0 + b_1 \cdot Z^{-1} + b_2 \cdot Z^{-2} + \ldots + b_n \cdot Z^{-n}}$$

where $\psi$ represents the output from the compensation means, $a_0, a_1 \ldots a_n, b_0, b_1 \ldots b_n$ are constants, and $Z^0$, $Z^{-1}, Z^{-2} \ldots Z^{-n}$ represent the current, last but one, last but two, ... last but n. sampling instants in the operation of the compensation means. respectively, so that $Z^0 \phi$ represents the current input to the compensation means, $Z^{-1}\phi$ represents the last but one input to the compensation means, $Z^0 \psi$ represents the current output from the compensation means, and so on. For further explanation of the above and of the generation of the constants for a desired transfer function, reference is directed to Forsythe W, "A new method for the computation of digital filter coefficients", Simulation 44:1 Jan. 23-31 1985. It should be noted that it is permitted to treat $Z^0$, $Z^{-1}$ etc as separate mathematical entities, and their superscripts 0, $-1$ etc can be treated as powers. This has the consequence that $Z^0$ equals 1, as any value to the power of zero equals one.

The above equation can be expressed alternatively in the following way:

$$Z^0 \psi = (1/b_0) \{[a_0 \cdot Z^0 \phi + a_1 \cdot Z^{-1}\phi + \ldots + a_n \cdot Z^{-n}\phi] - [b_1 \cdot Z^{-1}\psi + b_2 \cdot Z^{-2}\psi + \ldots + b_n \cdot Z^{-n}\psi]\}$$

Thus it can be seen that the current output value $Z^0\psi$ from the compensating means 300 is an arithmetic function of the current input value $Z^0\phi$, the last n input values $Z^{-1}\phi$ to $Z^{-n}\phi$, and the last n output values $Z^{-1}\psi$ to $Z^{-n}\psi$. The compensating means 300 may be arranged to perform this calculation as a recursive filtering operation using as few as, for example, the last five input and output values, that is to say n=5. However, alternatively, non-recursive or finite impulse response techniques may be used, and in this case, for example, the last seventy-nine input and output values may be used. In view of the amount of processing which is then involved, the compensating means is preferably implemented using a finite impulse response (FIR) digital filter device such as device DSP56200 available from Motorola Inc, USA.

The FIR filter is shown schematically in FIG. 8. The current input value $Z^0\phi$ is input from the microcomputer 302 to a shift register 400, which stores the current and last seventy-nine input values. A further shift register 402 stores the last seventy-nine output values. As shown, each of the stored input values and output values is multiplied by the respective coefficient $a_0$ to $a_{79}$ and $-b_1$ to $-b_{79}$, and the products are summed. The resulting sum is divided by the coefficient $b_0$ to produce the current output value $Z^0\psi$ which is then returned to Step 6. The calibration constants and a and b are then incremented as follows:

new (A) = old (A) + dA
new (B) = old (B) + dB
new (C) = old (C) + dC
new (D) = old (D) + dD
new (E) = old (E) + dE
new (a) = old (a) + da
new (b) = old (b) + db Step 7. It is then determined whether the total of the absolute values of the corrections made is less than a predetermined tolerance value tol, that is $$abs(dA) + abs(dB) + abs(dC) + abs(dD) + abs(dE) < tol?$$

If not, then steps "4" to "7" are repeated using the revised calibration constants new (A) to new (E), and new (a) and new (b), but if so the calibration constants are stored in the memory 44 (preferably a non-volatile part thereof) for use in subsequent measuring processes, and the calibration operation is terminated.

It will be apparent that various modifications can be made to the calibration process described above. For example, steps "4" to "6" may be carried out, say, six times in succession before step "7" is performed for the first time, and also if, say, twenty iterations do not provide a correction within tolerance, the calibration process may be terminated and a warning message may be given regarding non-convergence of the process.

The calibration technique described above employs a solution to a non-linear least squares problem using the Gauss-Newton algorithm and a QDR decomposition algorithm employing Givens transformations. In this connection, references is directed to Kennedy, William J., Jr.; Gentle, James E. "Statistical Computing", (1980), Marcel Dekker Inc. It will be apparent, however, that other standard non-linear least squares problem solving techniques may be applicable.

Utilizing this technique in an experimental apparatus, a range of 1.18 mm with a resolution of 37 nm, giving a range to resolution ratio of about 32000, has been achieved with an accuracy of 200 nm. Since the experimental apparatus involves an inductive transducer as described with reference to the drawings, this represents a substantial improvement in the state of the art.

Various other modifications are possible within the scope of the invention. For example, range switching may be included and, if desired, the compensation represented by the equation $Z = Az + Bz^2 + Cz^3$ may be selectively applied according to the selected range. For example, in certain ranges no compensation, or a different form of compensation, such as represented by the $Z = Az + Bz^2$ may be applied.

Although in the preferred embodiment as illustrated in the drawings, the stylus has been mounted for pivotal movement, requiring the correction for displacement thereof in the X direction as the stylus pivots, the invention may also be applied to arrangements in which the stylus is mounted for rectilinear movement in the Z direction, in which case the correction for movement tin the X direction will be unnecessary.

We claim:

1. A metrological apparatus for measuring physical surface geometry, said apparatus comprising a transducer, said transducer producing an analogue electrical signal representative of a characteristic of a physical surface the geometry of which is to be measured, and an analogue to digital converter the gain of which varies with frequency over a particular frequency range, said analogus electrical signal being input to said analogue to digital converter to be analogue to digital converted thereby into a digital signal, said apparatus further comprising processing means for processing said digital signal to compensate for said variation of gain with frequency over said particular range.

2. An apparatus as claimed in claim 1, wherein said processing means is arranged to receive a series of samples from said analogue to digital converter and to output a series of compensated samples, the value of a said compensated sample being determined by combining weighted values of a plurality of received samples and a plurality of preceding compensated samples.

3. An apparatus as claimed in claim 2, wherein said processing means includes a digital filter.

4. An apparatus as claimed in claim 1 wherein said analogue to digital converter comprises a tracking AC analogue to digital converter.

5. An apparatus as claimed in claim 1 wherein said transducer has a normal range over which said analogue electrical signal is substantially linearly related to a position detected by said transducer, and an extended range beyond said normal range, over which said analogue electrical signal is non-linearly related to a position detected by said transducer, and further comprising compensator means for processing one of said analogue electrical signal and said digital signal to generate a compensated signal which is compensated for non-linearity over said extended range so that said compensated signal is substantially linearly related to the detected position over said normal and extended ranges of said transducer.

6. An apparatus as claimed in claim 5, wherein said compensator means is operable to use a calibration constant B and the square of said one of said analogue electrical signal and said digital signal in producing said compensated signal.

7. An apparatus as claimed in claim 5, wherein said compensator means is operable to use a calibration constant C and the cube of said one of said analogue electrical signal and said digital signal in producing said compensated signal.

8. An apparatus as claimed in claim 5 wherein said transducer comprises a stylus and said apparatus further comprises drive means for traversing the transducer across a surface with said stylus in contact with said surface, said stylus being mounted by a pivot which is offset in the traverse direction from the point of contact between said stylus and said surface, and said apparatus further comprising means for providing a traverse position signal representative of the position of said pivot in the traverse direction, and traverse signal compensator means for processing said traverse position signal to compensate for variations in the difference between the position of said pivot in the traverse direction and the position of said point of contact in the traverse direction due to pivoting of said stylus.

9. An apparatus as claimed in claim 5, wherein said transducer comprises a stylus and the apparatus further comprises drive means for traversing said stylus across a surface in contact therewith, and means for providing a traverse position signal in accordance with the position in the transverse direction of the point of contact of said stylus with said surface, the position of said point of contact in the traverse direction varying with the position of said point of contact in a direction towards and away from said surface and the apparatus further comprising traverse signal compensator means to process said traverse position signal to compensate for said variations in the position of said point of contact.

10. An apparatus as claimed in claim 1, wherein said transducer comprises a pair of symmetrical coils and a core movable relative to said coils, the coils being connected as two arms of a bridge circuit.

11. A metrological apparatus comprising a transducer, said transducer producing an electrical signal representative of a surface characteristic and having a normal range over which said electrical signal is substantially linearly related to a position detected by said transducer and an extended range beyond said normal range, over which said electrical signal is non-linearly related to a position detected by said transducer, said apparatus further comprising compensator means for processing said electrical signal to generate a compensated signal which is compensated for non-linearity over said extended range so that said compensated signal is substantially linearly related to the detected position over said normal and extended ranges of said transducer.

12. An apparatus as claimed in claim 11, wherein said compensator means is operable to use the square of said electrical signal and a calibration constant B in producing said compensated signal.

13. An apparatus as claimed in claim 11, wherein said compensator means is operable to use the cube of said electrical signal and a calibration constant C in producing said compensated signal.

14. An apparatus as claimed in claim 11, wherein said transducer comprises a stylus and said apparatus further comprises drive means for traversing the transducer across a surface with said stylus in contact with said surface, said stylus being mounted by a pivot which is offset in the transverse direction from the point of contact between said stylus and said surface, and said apparatus further comprising means for providing a transverse position signal representative of the position of said pivot in the transverse direction, and traverse signal compensator means for processing said transverse position signal to compensate for variations in the difference between the position of said pivot in the traverse direction and the position of said point of contact in the traverse direction due to pivoting of said stylus.

15. An apparatus as claimed in claim 11, wherein said transducer comprises a stylus and the apparatus further comprises drive means for traversing said stylus across a surface in contact therewith, and means for providing a traverse position signal in accordance with the position in the traverse direction of the point of contact of said stylus with said surface, the position of said point of contact in the traverse direction varying with the position of said point of contact in a direction towards and away from said surface and the apparatus further comprising traverse signal compensator means to process said traverse position signal to compensate for said variations in the position of said point of contact.

16. A metrological apparatus comprising a transducer, said transducer comprising a stylus and producing an electrical signal representative of a characteristic of a surface across which the stylus is traversed while in contact therewith, and the apparatus further comprising drive means for traversing said stylus across a surface in contact therewith and means for providing a traverse position signal in accordance with the position in the traverse direction of the point of contact of said stylus with said surface, the position of said point of contact in the traverse direction varying with the position of said point of contact in a direction towards and away from said surface, and the apparatus further comprising traverse signal compensator means to process the traverse position signal to compensate for said variations in the position of said point of contact.

17. An apparatus according to claim 16 in which said stylus is mounted by a pivot which is offset in the traverse direction from said point of contact, said variation in the position in the traverse direction of said point of contact with the position of said point of contacting a direction towards and away from said surface comprises variation in the distance in the traverse direction between the position of said point of contact and the position of said pivot due to pivoting of said stylus, said traverse position signal represents the position of said pivot in the traverse direction, and said traverse signal compensator means processes said traverse position signal to compensate for variations in the said distance.

18. An apparatus as claimed in claim 16 wherein said traverse signal compensator means is operable to use said electrical signal and a calibration constant D in processing said traverse position signal.

19. An apparatus as claimed in claim 16 wherein said traverse signal compensator means is operable to use the square of said electrical signal and a calibration constant E in processing said traverse position signal.

20. A method of calibration of an apparatus which apparatus comprises a transducer, means to traverse said transducer over a surface, and means to output a traverse position signal representative of the position of the transducer in the traverse direction, said transducer outputting a transducer output signal representative of a characteristic of said surface, and at least a first one of said transverse position signal and said transducer output signal undergoing a variation from a linear relationship with the property represented thereby with variation, at least over a part of the range of said transducer, in a position of said surface detected by said transducer, said apparatus further comprising compensator means for processing said first signal to compensate said first signal for said variation undergone by said first signal, said compensator means using at least one of said output signal, the square of the output signal and the cube of the output signal in said processing together with at least one calibration constant, and said method of calibration comprising the steps of traversing said transducer over a surface of known form, storing a series of values of said output signal obtained during said traverse, setting an initial value for said at least one calibration constant, and determining a correction to said at least one calibration constant so that the stored signals as processed by said compensator means using said at least one calibration constant following correction tend to equal those signals which would be expected to be provided from a traverse of the surface of known form by an apparatus providing fully compensated signals.

21. A method as claimed in claim 20, wherein said step of determining a correction includes the step of calculating a difference measure for each stored value of said output signal involving a variable correction to said at least one calibration constant, and calculating values of said corrections which minimizes the sum of the squares of the difference measure.

* * * * *

UNITED STATES PATENT AND TRADEMARK OFFICE
CERTIFICATE OF CORRECTION

PATENT NO. : 5,150,314

DATED : September 22, 1992

INVENTOR(S) : Garratt et al.

It is certified that error appears in the above-identified patent and that said Letters Patent is hereby corrected as shown below:

Column 2, line 17, "tho" should read --the--.

Column 6, line 7, "G($\theta$)" should read --G($\phi$)--;

line 11, "G($\theta$)" should read --G($\phi$)--;

line 21, "n." should read --n,--;

line 22, "means." should read --means,--; and line 57, "device such" should read --device, such--.

Column 7, line 53, "high range to" should be deleted; and line 63, "$Z = Az + Bz^2 + Cz^2$" should read --$Z = Az + Bz^2 + Cz^3$--.

Column 8, line 44, "centro" should read --centre--.

UNITED STATES PATENT AND TRADEMARK OFFICE
CERTIFICATE OF CORRECTION

PATENT NO. : 5,150,314
DATED : September 22, 1992
INVENTOR(S) : Garratt et al.

It is certified that error appears in the above-identified patent and that said Letters Patent is hereby corrected as shown below:

Column 10, line 2, "analogus" should read --analogue--.

Column 11, line 39, "transverse direction" should read --traverse direction--;

line 42, "transverse position" should read --traverse position--;

line 43, "transverse direction" should read --traverse direction--; and line 45, "transverse position" should read --traverse position--.

Column 12, line 14, "contacting" should read --contact in--; and line 66, "minimizes" should read --minimize--.

Signed and Sealed this

Nineteenth Day of October, 1993

Attest:

BRUCE LEHMAN

Attesting Officer     Commissioner of Patents and Trademarks